Oct. 9, 1962 E. J. OLIVER 3,057,229
SAW TREATING APPARATUS AND METHOD
Filed Oct. 14, 1959 2 Sheets-Sheet 1

INVENTOR.
ETHEMER J. OLIVER
BY
*Learman, Learman + McCulloch*
ATTORNEYS

*INVENTOR.*
ETHEMER J. OLIVER

ATTORNEYS

United States Patent Office 3,057,229
Patented Oct. 9, 1962

3,057,229
SAW TREATING APPARATUS AND METHOD
Ethemer J. Oliver, Box 62, Pinconning, Mich.
Filed Oct. 14, 1959, Ser. No. 846,308
11 Claims. (Cl. 76—43)

This invention relates to a saw treating apparatus and method and more particularly to a device operable in conjunction with a saw sharpening machine to temper the sharpened saw teeth immediately after the teeth have been sharpened and which is actuated by mechanism operable in response to operation of the apparatus which indexes the saw blade to the grinding wheel.

Various kinds of machines have been proposed heretofore for use in tempering the teeth of saws. Such machines ordinarily are complete and separate from other machines which sharpen the saw teeth and require the saw blade to be introduced to the tempering apparatus either manually or by special mechanism which also is independent of the mechanism by means of which the saw blade is advanced through the sharpening machine. A principal object of the present invention is to provide apparatus adapted for attachment to a conventional saw sharpening machine and which is operable in response to the indexing mechanism of the saw sharpener to effect tempering of the sharpened saw teeth.

Another object of the invention is to provide saw tempering apparatus of the kind referred to which is capable of tempering each tooth of a saw, regardless of its set, immediately after it has been sharpened.

A further object of the invention is to provide a saw tempering device of the character described which is capable of being timed to coincide with the timing of the saw sharpening machine.

Another object of the invention is to provide a saw tempering attachment for a saw sharpening machine which is adaptable for use in conjunction with saws of varying sizes and kinds.

A further object of the invention is to provide a saw tempering attachment for a saw sharpening machine which is relatively inexpensive and yet which is highly efficient and durable in use.

Another object of the invention is to provide an improved method for sharpening and tempering the teeth of a saw blade.

Other objects and advantages of the invention will be pointed out specifically or will become apparent from the following description when it is considered in conjunction with the appended claims and the accompanying drawings, in which:

Figure 1:
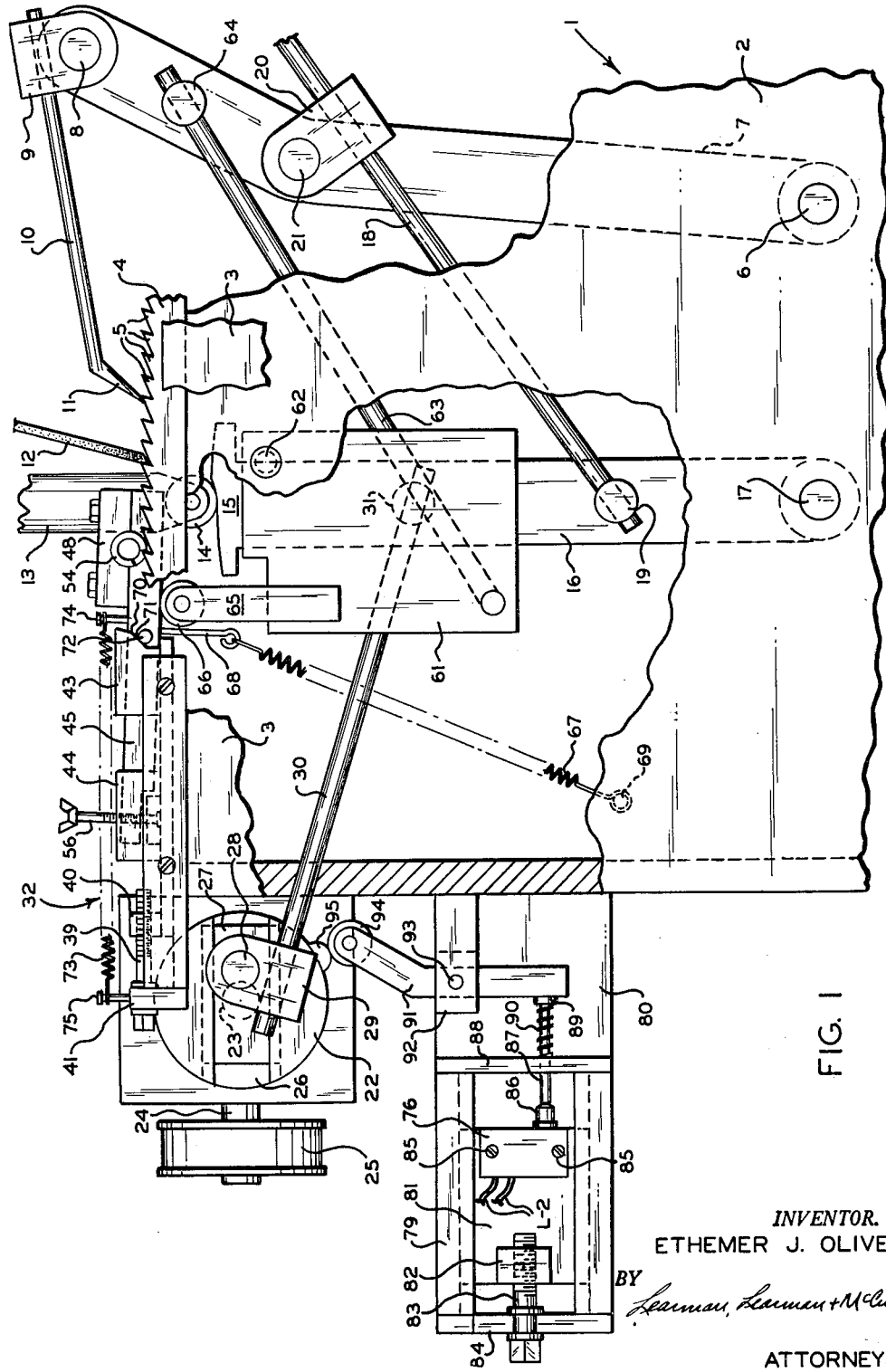
FIGURE 1 is a fragmentary, side elevational view of a portion of a saw sharpening machine equipped with saw tempering apparatus formed in accordance with the invention, certain parts being broken away and others being shown in section for the sake of clarity.
Figure 3:
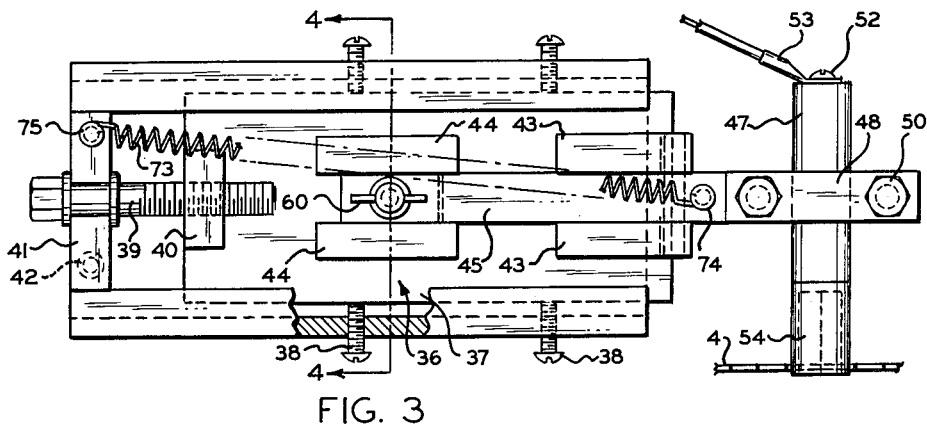
FIGURE 3 is a top plan view, partly in section, of the apparatus shown in FIGURE 2.

Apparatus constructed in accordance with the invention is adapted for use in conjunction with a conventional saw sharpening machine designated generally by the reference character 1. For purposes of illustration, the saw sharpening machine selected for illustrating the invention is a model E-C automatic combination grinder manufactured and sold by the Wardwell Manufacturing Company of Cleveland, Ohio. The saw sharpening machine comprises a frame or base 2 having guide rails 3 on which a band saw or hack saw blade 4 may be supported with its teeth 5 projecting upwardly. Pivoted on the base 2 by means of a pivot pin 6 is a lever or rock arm 7 having pivoted at its upper end, by means of a pin 8, a holder 9 in which one end of a pawl 10 is secured. The other end of the pawl 10 is formed as a tooth 11 which is adapted to engage the teeth 5 of the saw blade 4 and index the latter, tooth by tooth, past a grinding wheel 12 which is mounted for rotation on the upper end of a tappet 13 that is mounted on the frame 2 for vertical reciprocating movement by guides (not shown). The lower end of the tappet 13 is provided with a rotatable wheel 14 which rides upon a cam 15 fixed at the upper end of a lever 16. The lower end of the lever 16 is mounted on a rock shaft 17. The lever 16 is adapted to be rocked about the axis of the shaft 17 by means of a link 18 which is secured at one end to a holder 19 fast on the lever 16 and secured at its other end in a holder 20 which is pivoted on the crank 7 by means of a pin 21.

The construction and arrangement of the parts thus far described are conventional in the saw sharpening machine referred to above and are such that rocking of the lever 16 in a counterclockwise direction, as viewed in FIGURE 1, causes the cam 15 to exert a lifting force on the tappet 13 to raise it. Raising of the tappet lifts the grinding wheel 12 out of the path of the saw teeth 5. Counterclockwise rocking of the lever 16 also causes the lever 17 to be rocked counterclockwise by the link 18, whereupon the indexing pawl 10 will engage a tooth 5 and advance the saw blade 4 the space of one tooth. The timing of the cam 15 is such that when the saw blade 4 is advanced, the grinding wheel 12 will have been lifted clear of the path of the teeth 5. Rocking of the lever 16 clockwise from the position just described will cause the tappet 13 and the grinding wheel 12 to be lowered so as to permit the latter to grind the adjacent tooth 5, and the clockwise rocking of the lever 16 will return the indexing pawl 10 to a position such that its tooth 11 will be in a position to engage a succeeding tooth and cause advancement of the saw blade upon the next cycle of operation.

Means for effecting cyclic rocking of the lever 16 comprises rotatable disc 22 fixed at the end of a shaft 23 which is driven through a gear train (not shown) from a shaft 24. The shaft 24 is equipped with a drive pulley 25 adapted to be driven by a motor and belt assembly (not shown). The disc 22 is provided with a slideway 26 in which is adjustably mounted a slide 27. The slide has pivoted thereto, by means of a pin 28, a holder 29 in which one end of a drive rod 30 is secured. The other end of the drive rod is secured in a rotatable holder 31 which is mounted on the lever 16. The arrangement is such that rotation of the disc 22 causes oscillation of the lever 16 and the throw of the lever 16 may be varied by adjustment of the slide 27 in the slideway 26.

The apparatus thus far described is conventional in the particular saw sharpening machine referred to above and forms no part of the invention per se aside from its coaction therewith. The saw tempering apparatus of the invention comprises a saw tempering attachment designated generally by the reference character 32 and which may be installed on the saw sharpening machine either during or after the manufacture of the latter.

The tempering apparatus 32 includes a base 33 which may be welded, bolted, or otherwise suitably fixed to the machine frame 1. The base 33 includes side members 34 having undercut portions 35 therein forming a slideway. Received in the slideway is a slide member 36 having a base 37 received in the undercut portions 35. At intervals along the length of the side members 34 is provided a suitable number of threaded openings in which adjusting screws 38 are received. The screws 38 are adapted to bear against the slide base 37 to adjust the slide 36 from side to side.

Means is provided for adjusting the slide 36 fore and aft and comprises an adjusting screw 39 threadedly received in an end member 40 fixed to the slide 36 and being rotatably journaled in an end member 41 which may be secured to the slideway base 33 in any suitable manner such as by screws 42. The construction of the base 33 and the slide 36 is such that the slide 36 is adjustable both fore and aft and laterally of the base 33 for a purpose presently to be explained.

At the end of the slide 36 remote from the end member 40 is a pair of laterally spaced guide members 43 and between the ends of the slide 36 is another pair of similarly spaced guide members 44. Received between the guide elements 43 and 44 is a carrier member 45 having a semicircular groove 46 formed in its upper surface adjacent to its rear end. Received in the groove 46 is a bar 47 formed of copper or other electrically conductive metal. The bar is maintained in place on the carrier 45 by means of a clamp plate 48 having a similar semicircular groove 49 formed therein and provided with bolts 50 which extend through the plate 48 into threaded openings at the rear end of the carrier 45. The bar 47 is electrically insulated from the members 45 and 48 by electrically nonconductive material 51 which lines the grooves 46 and 49.

To one end of the copper bar 47 is connected by suitable means such as a screw 52 a current conducting wire 53. At the other end of the bar 47 is soldered or otherwise suitably fixed an electrode 54 which, if desired, may be formed of the same material from which welding electrodes conventionally are made. The electrode 54 is generally cylindrical and hollow, but a portion of its wall is cut away as at 55 so that, in end elevation, the electrode 54 presents substantially a C-shaped appearance. The slot or notch 55 is adapted to receive a portion of a saw tooth 5 so that one edge of the slot engages the saw tooth and permits an electric current to flow therebetween as will be more fully pointed out hereinafter.

When tempering the teeth of a saw blade, it is desirable that only the tip of each tooth be tempered inasmuch as it is the tip of a tooth which first becomes dull after the saw has been put to use. Thus, it is desirable that the electrode 54 be manipulatable or adjustable so as to permit it to engage only the tip of a saw blade tooth, irrespective of the size of the latter. Accordingly, adjusting means is provided for exerting a control over the position of the welding tip. The adjusting means comprises a headed bolt 56 having its shank extended through a threaded opening at the forward end of the carrier member 45 and having its head 57 rockably received in a socket member 58, the latter being slideably mounted between the guides 44. While the bolt 56 is free to rock in all directions, it is not possible to remove the head 57 from the socket member, due to the provision of a restraining element 59 interposed between the carrier member 45 and the head 57 of the bolt and secured to the socket member 58. The arrangement is such that rotation of the bolt 56 in one direction or the other causes the forward end of the carrier member 45 to raise or lower, thereby effecting vertical adjustment of the electrode 54. To facilitate adjustment of the bolt 56, the latter may be fixed to a wing or other nut 60.

Figure 2:
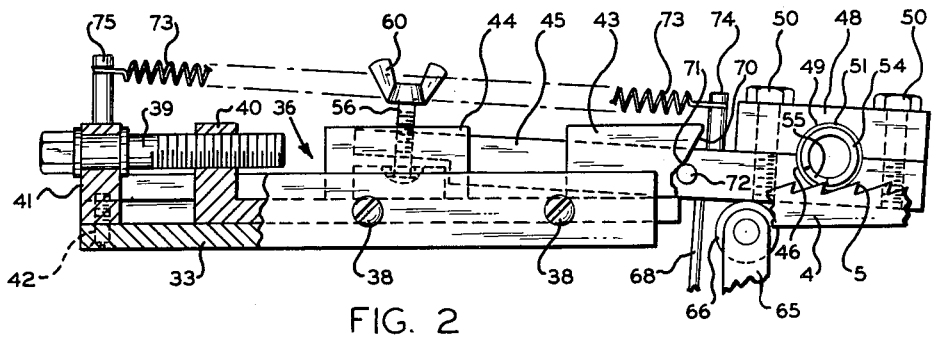
FIGURE 2 is a fragmentary view, partly in side elevation and partly in section, of the saw tempering attachment.
Figure 4:
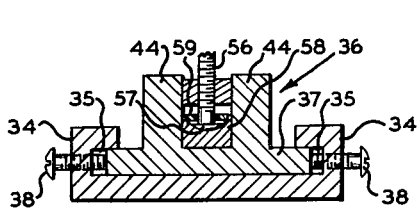
FIGURE 4 is a sectional view taken on the line 4—4 of FIGURE 3.
Figure 5:
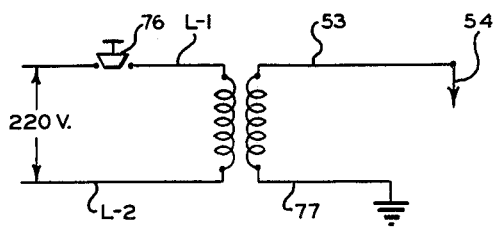
FIGURE 5 is a simple schematic diagram of an electric circuit.

It has been pointed out that it is desirable for the electrode 54 to engage only the tip of the saw tooth. As is best shown in FIGURES 1 and 2, the active or operative position of the electrode is such that a portion of a saw tooth is received in the slot or notch 55. This means that the electrode is below the level of the teeth tips, and to avoid excessive wear of the electrode due to movement of the saw blade, means is provided for shifting the electrode out of the path of the saw teeth when the saw blade is being advanced by the indexing mechanism.

Referring to FIGURE 1, the apparatus for shifting the electrode comprises a plate 61 pivoted adjacent to one of its corners on the machine frame 1 by means of a pivot pin 62. To another part of the plate 61 is pivoted one end of a push rod 63, the other end of which is received in a holder 64 pivoted to the rock lever 7. The arrangement of the parts is such that rocking of the lever 7 in a counterclockwise direction causes clockwise rocking of the plate 61 about its pivot 62, and vice versa.

The plate 61 has secured thereto a rigid link 65 on which is journaled a roller 66 that bears at all times on the lower surface of the rear end of the carrier member 45. As a consequence, clockwise rocking of the plate 61 causes the roller 66 to swing the rear end of the carrier member 45 upwardly so as to enable the electrode 54 to clear the path of the saw teeth. When the plate 61 is rocked the other way, that is, counterclockwise, the carrier 45 returns to the position shown in FIGURE 1 and, if desired, the return of the carrier may be made more positive by attaching a spring 67 to anchors 68 and 69 secured respectively to the carrier 45 and the machine frame 2. It will be understood that the raising and lowering of the carrier 45 takes place in response to operation of the saw indexing mechanism, the details and operation of which already have been described.

Most, if not all, saw blades of the hack and band type have rake teeth of the kind shown in FIGURE 1. When working on a saw having teeth of this type, merely raising and lowering the carrier 45 will not necessarily locate the welding electrode 54 in the desired position relative to the saw teeth. Consequently, it is preferable that the carrier partake of movement fore and aft in addition to vertical movement so as to effect the desired placement of the electrode relative to each successive saw tooth. The desired fore and aft movement of the carrier may be accomplished by shaping the rear ends of the guide members 43 as cams 70 having an upper and rearwardly inclined cam surface 71 adapted to be engaged by a follower pin 72 carried at the rear end of the carrier member 45. The arrangement of the cam 70 and follower 72 is such that upward movement of the carrier causes the cam follower 72 to bear against the cam surface 71 so as to force the carrier member 45 rearwardly. The carrier member 45 is caused to move forwardly during its downward movement by a spring 73 anchored at one end to a post 74 mounted on the carrier 45 and anchored at its other end to a post 75 mounted on the end wall 41 of the base member 33. The desired contact between the electrode and the teeth thus is achieved in part by the vertical adjustability of the carrier and in part by the fore and aft adjustability thereof under the influence of the adjusting screw 39.

The saw tempering apparatus includes a transformer having its primary coil connected to a source of 220 volt electric power through power lines L-1 and L-2. In the line L-2 is an on-off switch 76 which will be described in greater detail hereinafter. One terminal of the secondary transformer coil is connected by the line 53 to the electrode 54 and the other secondary coil terminal is connected by a wire 77 to ground. The arrangement is such that closing of the switch 76 makes a circuit to the transformer so as to supply power to the electrode 54.

The tempering of a saw tooth will depend upon the amount and duration of the current supplied to the electrode. In many instances a current of 5 amperes applied to a tooth for a duration of about $\frac{1}{10}$ second is sufficient to cause the tooth tip to glow red and adequately temper it. It is desirable, however, that the duration of the applied current be variable within certain limitations. It also is desirable that the making and breaking of the tempering circuit be automatic. Both of these objectives may be accomplished with apparatus illustrated in FIGURE 1 and which comprises a slideway 79 supported on a bracket 80 which in turn is fixed to the machine base 2. On the slideway 79 is mounted a slide member 81 provided with an upstanding ear 82 in which is threadedly received an adjusting screw 83 journaled for rotation in an end block 84 supported on the slideway 79. The switch 76 is fixed to the slide 81 by means of screws 85 or the like so as to be shiftable with the slide. The switch 76 includes a plunger 86 which is adapted to be operated by a push rod 87 which is mounted for reciprocating movements through a flange 88 forming part of the bracket 80. One end of the push rod 87 is adapted to bear against the plunger 86 and the other end is provided with an enlargement 89 against which one end of a spring 90 seats. The other end of the spring bears against the flange 88 so that the spring constantly exerts a force on the push rod tending to move it away from the plunger 86. Means for pushing the rod 87 against the plunger 86 and, consequently, closing the switch 76 comprises a bell crank 91 pivoted on a flange 92 of the bracket 80 by means of a pin 93. One end of the bell crank bears against the push rod 87 and the other end is provided with a roller 94 which is adapted to be engaged by a cam 95 located at the periphery of the rotatable disc 22. Upon rotation of the disc 22, the cam 95 periodically will engage the roller 94 so as to cause rocking of the bell crank 91. This, in turn, will cause periodic closing of the switch 76 and the duration that the switch is held closed will depend upon the extent to which the plunger 86 is depressed. As has been indicated previously, the switch 76 is mounted on the slide 81 for adjustment so as to permit the extent of depression of the plunger 86 to be varied.

To condition the apparatus for operation, a saw blade 4 is placed in the guide 3 for presentation to the grinding wheel 12. The slide 27 is adjusted relatively to the rotatable disc 22 and the pawl 10 is adjusted relatively to the rock lever 7 so as to cause automatic indexing of the saw, tooth by tooth. When the saw sharpening machine's indexing mechanism has been satisfactorily adjusted, the saw tempering apparatus 32 may be adjusted in the manner previously described so as to assure engagement of the electrode 54 with the tip of each successive saw tooth 5. When the necessary adjustments have been made, the driving motor (not shown) may be started to cause rotation of the disc 22, whereupon each successive saw tooth 5 will first be sharpened and then tempered. After the first few teeth have been sharpened, the sharpening of certain teeth and the tempering of other previously sharpened teeth will take place simultaneously.

The disclosed embodiment is representative of a presently preferred form of the invention, but is intended to be illustrative rather than definitive thereof. The invention is defined in the claims.

I claim:

1. A combined saw sharpening and tempering machine comprising a frame; means on said frame for supporting a saw blade for movement along a path; a sharpening device mounted adjacent to said path for engagement with successive teeth of said blade; indexing means on said frame for presenting said blade, tooth by tooth, to said sharpening device; tooth heating means movably mounted adjacent to said path; and means interconnecting said indexing means and said heating means operable in response to operation of said indexing means to move said heating means toward said path for effecting heating of successive saw teeth by said heating means.

2. A combined saw sharpening and tempering machine comprising a frame; means on said frame for supporting a saw blade for movement along a path; a sharpening device mounted adjacent to said path; indexing means on said frame for presenting said blade, tooth by tooth, to said sharpening device; electrical heating means mounted for movement adjacent to said path; and means interconnecting said indexing means and said heating means operable in response to operation of said indexing means for moving said heating means into and out of engagement with successive sharpened teeth, whereby successive sharpened teeth may be heated.

3. A combined saw sharpening and tempering machine comprising a frame; means on said frame for supporting a saw blade for movement along a path; a sharpening device mounted adjacent to said path; indexing means on said frame for presenting said blade, tooth by tooth, to said sharpening device; normally inactive heating means mounted for movement adjacent to said path; means interconnecting said indexing means and said heating means operable in response to operation of said indexing means for moving said heating means into and out of engagement with successive sharpened teeth; and timing means associated with said heating means for activating the latter only when said heating means and a tooth of said saw are in engagement.

4. A combined saw sharpening and tempering machine comprising a frame; means on said frame for supporting a saw blade for movement along a path; a tooth sharpening device mounted adjacent to said path; indexing means for presenting said saw, tooth by tooth, to said sharpening device; a tooth heating device; means mounting said heating device adjacent to said path for movement into and out of engagement with successive sharpened teeth; and means interconnecting said indexing means and said heating device operable in response to operation of said indexing means for effecting movements of said heating device.

5. The construction set forth in claim 4 including control means operable to limit operation of said heating device to those periods when the latter is in engagement with the teeth of said saw.

6. A combined saw sharpening and tempering machine comprising a frame; means on said frame for supporting a saw blade for movement along a path; a saw sharpening device mounted adjacent to said path; indexing means for presenting said saw, tooth by tooth, to said sharpening device; a normally inactive heating device; means mounting said heating device adjacent to said path for movements into and out of said path so as to cause said heating device to move into and out of engagement with successive sharpened teeth; means interconnecting said indexing means and said heating device for effecting movements of the latter in response to operation of said indexing means; and means reacting between said heating device and said indexing means operable in response to operation of said indexing means for activating said heating device when the latter is in engagement with a tooth.

7. The construction set forth in claim 6 wherein said heating device is electrically operated.

8. A saw tempering machine for tempering successively the teeth of a saw blade movable along a path, said machine comprising a tooth heating device; means mounting said device for movements into and out of engagement with successive teeth of said blade as it moves along said path; means operatively engaging said blade for moving the latter along said path; and means interconnecting said device and said blade moving means and operable in response to operation of said blade moving means for effecting movements of said device in timed relation to the movement of said blade along said path.

9. A saw tempering machine for tempering successively the teeth of a saw blade movable along a path, said machine comprising a base; a carrier member movably mounted on said base for movements along said path and towards and away from said path; means connected to said carrier member for moving the latter towards and away from said path; means reacting between said carrier member and said base operable to impart movement to said carrier member along said path in response to movement of said carrier member towards and away from said path; a heating element carried by said member and being movable with the latter into and out of engagement with successive teeth of said blade; and means connected to said heating element for heating the latter when it is in engagement with a tooth of said blade.

10. The construction set forth in claim 9 wherein said heating element is electrically operated.

11. The method of sharpening and tempering successive teeth of a saw blade which comprises the steps of advancing a saw blade to a sharpening station in increments of distance corresponding to the spacing between adjacent teeth; sharpening each tooth while it is at said station, the incremental advancing of said saw blade successively presenting each tooth of said saw blade to a tooth tempering station; and successively tempering the tip of each tooth at said tempering station, the tempering of some of said teeth being accomplished simultaneously while others of said teeth are being sharpened.

References Cited in the file of this patent

UNITED STATES PATENTS

| | | |
|---|---|---|
| 974,099 | Sundborg | Oct. 25, 1910 |
| 1,130,650 | Whitaker | Mar. 2, 1915 |
| 1,217,095 | Krump | Feb. 20, 1917 |
| 1,352,140 | Napier | Sept. 7, 1920 |
| 1,382,819 | Carlson | June 28, 1921 |
| 1,662,516 | Hustadt | Mar. 13, 1928 |
| 1,913,354 | Trimble | June 6, 1933 |
| 2,326,674 | Pavitt | Aug. 10, 1943 |
| 2,333,298 | Daggett | Nov. 2, 1943 |
| 2,480,457 | Erler | Aug. 30, 1949 |

FOREIGN PATENTS

| | | |
|---|---|---|
| 183,777 | Austria | Nov. 10, 1955 |
| 498,785 | Italy | Sept. 30, 1954 |
| 965,731 | France | Sept. 20, 1950 |